US012804757B2

(12) United States Patent
Chen et al.

(10) Patent No.: US 12,804,757 B2
(45) Date of Patent: Nov. 17, 2026

(54) WIRELESS COMMUNICATION GAP CONFIGURATION

(71) Applicant: Apogee 5G Global, LLC, Plano, TX (US)

(72) Inventors: Yu Chen, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 500 days.

(21) Appl. No.: 18/211,569

(22) Filed: Jun. 19, 2023

(65) Prior Publication Data

US 2023/0413365 A1 Dec. 21, 2023

(30) Foreign Application Priority Data

Jun. 20, 2022 (CN) ......................... 202210696065.9

(51) Int. Cl.

| | |
|---|---|
| ***H04W 76/20*** | (2018.01) |
| ***H04L 1/1607*** | (2023.01) |
| ***H04W 8/20*** | (2009.01) |

(52) U.S. Cl.

CPC ........... *H04W 76/20* (2018.02); *H04L 1/1642* (2013.01); *H04W 8/20* (2013.01)

(58) Field of Classification Search

CPC ....... H04W 76/20; H04W 8/20; H04W 76/15; H04W 76/27; H04L 1/1642; H04L 1/0003; H04L 1/0009

See application file for complete search history.

(56) References Cited

U.S. PATENT DOCUMENTS

| | | | | |
|---|---|---|---|---|
| 2021/0329618 | A1* | 10/2021 | Chervyakov | G01S 5/0221 |
| 2022/0104163 | A1* | 3/2022 | Kim | H04W 60/005 |
| 2023/0048297 | A1* | 2/2023 | Lee | H04W 24/08 |
| 2023/0127705 | A1* | 4/2023 | Ozturk | H04W 76/15 370/329 |
| 2023/0403550 | A1* | 12/2023 | Kim | H04W 8/22 |
| 2024/0129711 | A1* | 4/2024 | Kim | H04W 68/005 |
| 2024/0172096 | A1* | 5/2024 | Cui | H04W 48/14 |
| 2024/0188176 | A1* | 6/2024 | Jung | H04W 76/27 |

(Continued)

OTHER PUBLICATIONS

Third Generation Partnership Project, "Technical Specification Group Radio Access Network; NR; Multiplexing and channel coding (Release 17)," 3GPP TS 38.212 V17.1.0 (Mar. 2022).

(Continued)

*Primary Examiner* — Nicholas A Jensen
*Assistant Examiner* — Ayodele Lawrence Olubodun
(74) *Attorney, Agent, or Firm* — Volpe Koenig

(57) ABSTRACT

The present application discloses a method and device for wireless communications, comprising receiving a first signaling, the first signaling comprising a first field, the first field configuring a first gap set; a position of the first field in the first signaling being used to determine whether the first gap set is applied to an MCG; wherein the first gap set comprises at least a first gap; the meaning of the phrase that the first field configures a first gap set comprises: the first field indicates a gap length, a starting SFN, and a starting sub-frame of the first gap; the first signaling is RRCReconfiguration; the present application facilitates network optimization, improves communication compatibility, and reduces resource consumption by transmitting a first signaling.

20 Claims, 4 Drawing Sheets

(56) References Cited

U.S. PATENT DOCUMENTS

| | | | | |
|---|---|---|---|---|
| 2024/0365370 | A1* | 10/2024 | Liu ..................... | H04W 72/566 |
| 2025/0008361 | A1* | 1/2025 | Abraham .............. | H04W 76/15 |

OTHER PUBLICATIONS

Third Generation Partnership Project, "Technical Specification Group Radio Access Network; NR; Physical layer procedures for data (Release 17)," 3GPP TS 38.214 V17.1.0 (Mar. 2022).

Third Generation Partnership Project, "Technical Specification Group Radio Access Network; NR; Radio Resource Control (RRC) protocol specification (Release 17)," 3GPP TS 38.331 V17.0.0 (Mar. 2022).

* cited by examiner

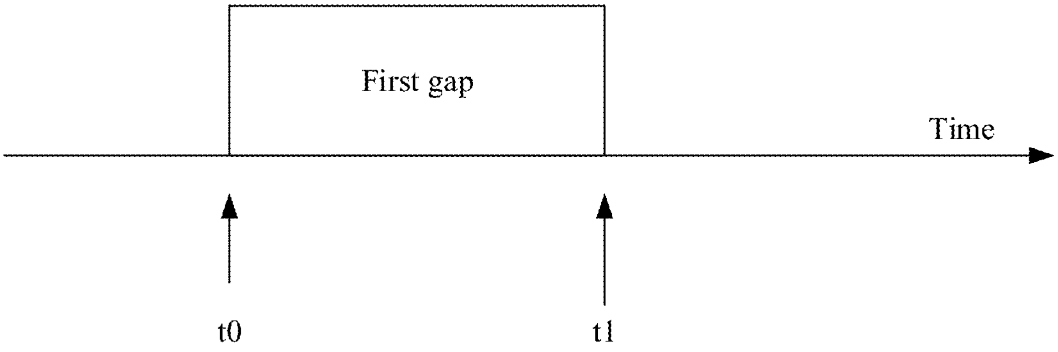
FIG. 6
```
RRCMessage-IEs ::= SEQUENCE {
field1              InformationElement1
field2              InformationElement2
...,
}
InformationElement1 ::= SEQUENCE {
field11             InformationElement11
field12             InformationElement12
...,
}
InformationElement2 ::= SEQUENCE {
field21             InformationElement11
...
}
```
FIG. 7
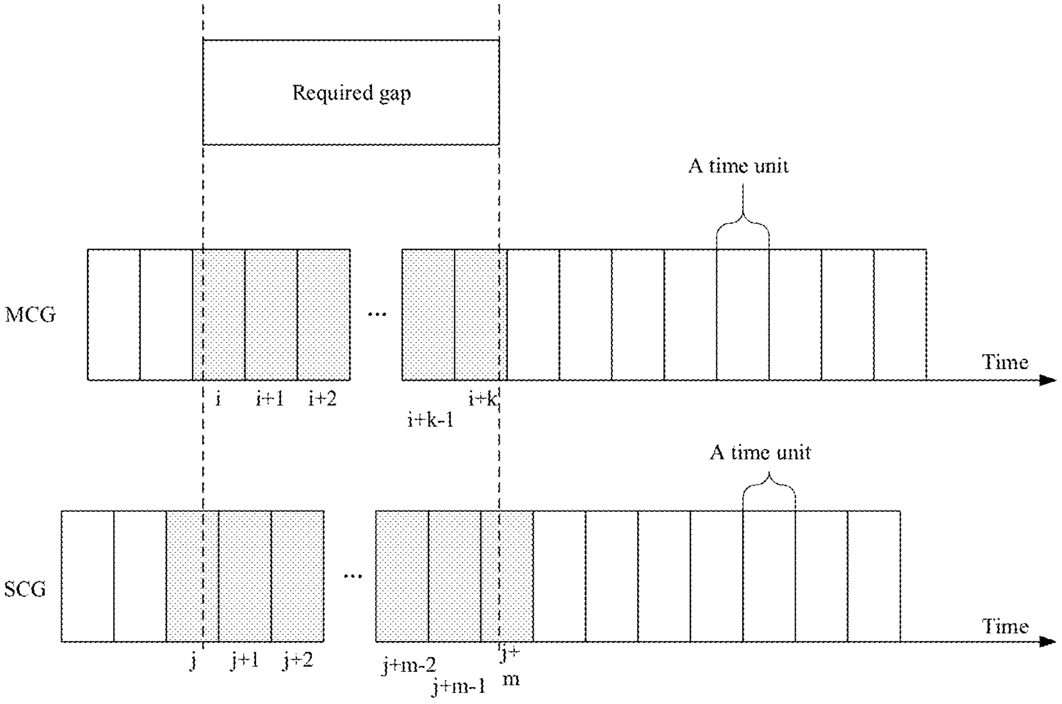
FIG. 8

WIRELESS COMMUNICATION GAP CONFIGURATION

CROSS REFERENCE TO RELATED APPLICATIONS

This application claims the priority benefit of Chinese Patent Application 202210696065.9, filed on Jun. 20, 2022, the full disclosure of which is incorporated herein by reference.

BACKGROUND

Technical Field

The present application relates to transmission methods and devices in wireless communication systems, especially to reduce traffic interruption and improve service quality of traffic in communications, and in particular to a method and device for being in communications with multiple networks at the same time.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72th plenary decided to conduct the study of New Radio (NR), or what is called fifth Generation (5G). A work Item (WI) of NR was approved at 3GPP RAN #75th plenary to standardize the NR.

In communications, whether Long Term Evolution (LTE) or 5G NR involves features of accurate reception of reliable information, optimized energy efficiency ratio, determination of information efficiency, flexible resource allocation, scalable system structure, efficient non-access layer information processing, low service interruption and dropping rate and support for low power consumption, which are of great significance to the maintenance of normal communications between a base station and a UE, reasonable scheduling of resources and balancing of system payload. Those features can be called the cornerstone of high throughout and are characterized in meeting communication requirements of various traffic, improving spectrum utilization and improving service quality, which are indispensable in enhanced Mobile BroadBand (eMBB), Ultra Reliable Low Latency Communications (URLLC) and enhanced Machine Type Communications (eMTC). Meanwhile, in the following communication modes, covering Industrial Internet of Things (IIoT), Vehicular to X (V2X), Device to Device communications, Unlicensed Spectrum communications, User communication quality monitoring, network planning optimization, Non-Territorial Networks (NTN), Territorial Networks (TN), and Dual connectivity system, there are extensive requirements in radio resource management and selection of multi-antenna codebooks as well as in signaling design, adjacent cell management, service management and beamforming. Transmission methods of information are divided into broadcast transmission and unicast transmission, both of which are essential for 5G system for that they are very helpful to meet the above requirements. The UE can be connected to the network directly or through a relay.

With the increase of scenarios and complexity of systems, higher requirements are raised for interruption rate and time delay reduction, reliability and system stability enhancement, service flexibility and power saving. At the same time, compatibility between different versions of different systems should be considered when designing the systems.

SUMMARY

In multiple communication scenarios, when a User Equipment (UE) (terminal/mobile phone) needs to be in communications with multiple networks, especially when MUlti-SIM (MUSIM) cards are used, coordination problems between networks are involved. When the hardware of the UE itself is not sufficient to be in communications with two networks simultaneously, independently, without any impact, and in parallel, and if a certain degree of coordination can be based on network assistance or initiated by the UE can help avoid mutual influence between the two networks. For example, when the UE needs to be in communications with another network, but the current network also indicates that the UE transmits or receives data, impact will be incurred. In this case, it is necessary to configure some gaps, in which the UE can leave the current network for simple communications with a destination network, these simple communications comprise receiving a paging or making a measurement, etc., which can be completed in a short time, so the configured gap can be very short, which also helps to reduce the impact on the current network, since the UE cannot leave the current network for a long time, otherwise it will lose its connection to this network and cause an interruption to the current network communication. Some UEs may have two receivers and two transmitters that can receive or transmit signals from both networks, but when both transceivers are used to communicate with the current network, for example when dual connectivity (DC) is used, and for reasons such as higher throughput rates or higher reliability, the UE may choose to request the current network to release a transceiver if the UE is only communicating with other networks, the cost of releasing a transceiver is too high and can seriously affect the communication with the previous network. In addition, the compatibility of different versions of protocols is also an important aspect to consider. It should be noted that the different networks corresponding to the two SIM cards of UE may be networks of different operators, so coordination between networks is very limited and it is difficult to rely on coordination between networks. Even due to privacy issues, it is necessary to avoid unnecessary user information leakage between networks as much as possible. When UE needs to communicate with another network, it can only request coordination from one or two networks separately, and cannot rely on coordination between networks. Therefore, for supporting two transceivers, such as UE that supports DC, it is a problem that needs to be solved how to adopt appropriate methods to reduce the mutual influence during communication between the two networks and meet the communication needs with the two networks.

To address the above problem, the present application provides a solution. It should be noted that the method proposed in the present application can also be used to solve other problems.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict.

The present application provides a method in a first node for wireless communications, comprising:

receiving a first signaling, the first signaling comprising a first field, the first field configuring a first gap set; a position of the first field in the first signaling being used to determine whether the first gap set is applied to an MCG;

herein, the first gap set comprises at least a first gap; the meaning of the phrase that the first field configures a first gap set comprises: the first field indicates a gap length, a starting System Frame Number (SFN), and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, a problem to be solved in the present application comprises: how to support different communication requirements in multi-SIM or multi-network communications.

In one embodiment, advantages of the above method comprise: it better supports multi-SIM card communications, improves efficiency, avoids communication interruption, simplifies system design, reduces system complexity, and has good compatibility.

Specifically, according to one aspect of the present application, the first gap set is for MUSIM.

Specifically, according to one aspect of the present application, a first message is transmitted, and the first message is used to request an aperiodic gap starting at a first frame and a first sub-frame for MUSIM;

herein, the starting SFN of the first gap indicated by the first field is the first frame, the starting sub-frame of the first gap indicated by the first field is the first sub-frame, and the first gap is an aperiodic gap; the gap length of the first gap indicated by the first field belongs to a first gap length set, and the first gap length set only comprises and 20 ms.

Specifically, according to one aspect of the present application, the first message indicates whether the requested aperiodic gap starting at the first frame and the first sub-frame for MUSIM is applied to an MCG or an SCG.

Specifically, according to one aspect of the present application, after the first signaling, a second signaling is received, the second signaling comprises a second field, and the second field is used to indicate releasing the first gap;

herein, a second signaling is RRCReconfiguration; the position of the first field in the first signaling belongs to the first position set, whether the first gap is applied to an MCG or an SCG is unrelated to a position of the second field in the second signaling.

Specifically, according to one aspect of the present application, within the first gap set, at least one operation in a first operation set is executed, and the first operation set comprises: cell identification and measurement, paging monitoring, SIB acquisition, and on-demand acquisition of system information;

herein, the first operation set is for a target network, and the target network is a network other than a transmitter of the first signaling.

Specifically, according to one aspect of the present application, whether the first gap set is applied to an SCG is unrelated to whether an SCG of the first node is activated.

Specifically, according to one aspect of the present application, an occurrence of Radio Link Failure (RLF)

in a first cell group is determined, and as a response to the behavior of determining an occurrence of RLF in a first cell group, the first gap set is released;

herein, a cell group to which the first gap set is applied comprises the first cell group.

The present application provides a method in a first node for wireless communications, comprising: receiving a first signaling, the first signaling comprising a first field, the first field configuring a first gap set; a position of the first field in the first signaling being used to determine whether the first gap set is applied to an MCG;

herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the position of the first field in the first signaling is any position in a second position set, the first field is applied to at least MCG in an MCG and an SCG, when the position of the first field in the first signaling is any position in a first position set, the first field is applied to only SCG in an MCG and an SCG, the first position set and the second position set respectively comprise at least one position, and any position in the first position set is not a first level sub-item of the first signaling; the first position set and the second position set are orthogonal.

Specifically, according to one aspect of the present application, the second position set comprises a first level sub-item of the first signaling.

Specifically, according to one aspect of the present application, the second position set comprises cellgroupconfig for an MCG.

Specifically, according to one aspect of the present application, the second position set does not comprise a first level sub-item of the first signaling.

Specifically, according to one aspect of the present application, the second position set comprises a position of cellgroupconfig for an MCG.

The present application provides a method in a first node for wireless communications, comprising:

receiving a first signaling, the first signaling comprising a first field, the first field configuring a first gap set; whether the first field explicitly indicates the first gap set being applied to an SCG in an MCG and an SCG;

herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that whether the first field explicitly indicates the first gap set is applied to an SCG in an MCG and an SCG is: when the first gap set is applied to an MCG, the starting SFN and the starting sub-frame of the first gap indicated by the first field are based on timing of a PCell; when the first gap set is applied to an SCG, the starting SFN and the starting sub-frame of the first gap indicated by the first field are based on timing of a PSCell.

Specifically, according to one aspect of the present application, the first node is an IoT terminal.

Specifically, according to one aspect of the present application, the first node is a relay.

Specifically, according to one aspect of the present application, the first node is a U2N remote UE.

Specifically, according to one aspect of the present application, the first node is a vehicle terminal.

Specifically, according to one aspect of the present application, the first node is an aircraft.

Specifically, according to one aspect of the present application, the first node is a mobile phone.

Specifically, according to one aspect of the present application, the first node is a communication terminal supporting multi-SIM card communications.

The present application provides a method in a second node for wireless communications, comprising:

transmitting a first signaling, the first signaling comprising a first field, the first field configuring a first gap set; a position of the first field in the first signaling being used to determine whether the first gap set is applied to an MCG;

herein, the first gap set comprises at least a first gap; the meaning of the phrase that the first field configures a first gap set comprises: the first field indicates a gap length, a starting SFN, and a starting sub-frame of the first gap;

the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

Specifically, according to one aspect of the present application, the first gap set is for MUSIM.

Specifically, according to one aspect of the present application, a first message is received, and the first message is used to request an aperiodic gap starting at a first frame and a first sub-frame for MUSIM;

herein, the starting SFN of the first gap indicated by the first field is the first frame, the starting sub-frame of the first gap indicated by the first field is the first sub-frame, and the first gap is an aperiodic gap; the gap length of the first gap indicated by the first field belongs to a first gap length set, and the first gap length set only comprises and 20 ms.

Specifically, according to one aspect of the present application, the first message indicates whether the requested aperiodic gap starting at the first frame and the first sub-frame for MUSIM is applied to an MCG or an SCG.

Specifically, according to one aspect of the present application, after the first signaling, a second signaling is transmitted, the second signaling comprises a second field, and the second field is used to indicate releasing the first gap;

herein, a second signaling is RRCReconfiguration; the position of the first field in the first signaling belongs to the first position set, whether the first gap is applied to an MCG or an SCG is unrelated to a position of the second field in the second signaling.

Specifically, according to one aspect of the present application, the second node is a satellite.

Specifically, according to one aspect of the present application, the second node is a relay.

Specifically, according to one aspect of the present application, the second node is a vehicle terminal.

Specifically, according to one aspect of the present application, the second node is an aircraft.

Specifically, according to one aspect of the present application, the second node is a base station.

Specifically, according to one aspect of the present application, the second node is a cell or cell group.

Specifically, according to one aspect of the present application, the second node is a gateway.

Specifically, according to one aspect of the present application, the second node is an access point.

The present application provides a first node for wireless communications, comprising:

a first receiver, receiving a first signaling, the first signaling comprising a first field, the first field configuring a first gap set; a position of the first field in the first signaling being used to determine whether the first gap set is applied to an MCG;

herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

The present application provides a second node for wireless communications, comprising:

a second transmitter, transmitting a first signaling, the first signaling comprising a first field, the first field configuring a first gap set; a position of the first field in the first signaling being used to determine whether the first gap set is applied to an MCG;

herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, the present application has the following advantages over conventional schemes:

firstly, the method proposed in the present application can support communications with two networks at the same time.

the impact on the current network can be reduced as much as possible, and the current network can still use 2 transceivers, use SCGs, or support DC.

good system forward compatibility can be maintained good system backward compatibility can be maintained it is conducive to ensuring the quality of traffic and reducing communication interruptions.

it is conducive to saving network resources.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a flowchart of a first gap according to one embodiment of the present application;

FIG. 7 illustrates a schematic diagram of a position according to one embodiment of the present application;

FIG. 8 illustrates a schematic diagram of a gap according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
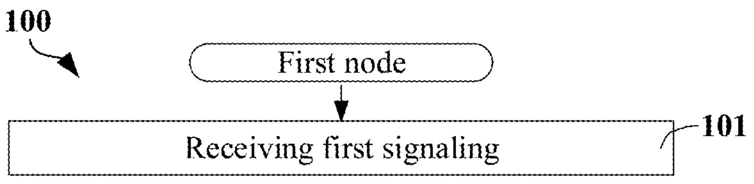
FIG. 1 illustrates a flowchart of receiving a first signaling according to one embodiment of the present application.

Embodiment 1 illustrates a schematic diagram of receiving a first signaling according to one embodiment of the present application, as shown in FIG. 1. In FIG. 1, each step represents a step, it should be particularly noted that the sequence order of each box herein does not imply a chronological order of steps marked respectively by these boxes.

In embodiment 1, a first node in the present application receives a first signaling in step 101;

herein, the first signaling comprises a first field, the first field configures a first gap set; a position of the first field in the first signaling is used to determine whether the first gap set is applied to an MCG; herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, the first node is a User Equipment (UE).

In one embodiment, the first node has two SIM cards, respectively for two networks;

In one subembodiment of the embodiment, the two networks are respectively LTE network and NR network;

In one subembodiment of the embodiment, the two networks are respectively NR network and NR network;

In one subembodiment of the embodiment, the two networks are respectively non-3GPP network and 3GPP network.

In one subembodiment of the embodiment, the two networks are respectively V2X network and NR network.

In one embodiment, the first node has two SIM cards, one of which is for a first network; and the other one is for a second network.

In one embodiment, the first node has two SIM cards, and a first network and a second network are different Public Land Mobile Networks (PLMNs).

In one embodiment, the SIM card comprises Universal Subscriber Identity Module (USIM).

In one embodiment, the SIM card comprises an eSIM card.

In one embodiment, the SIM card comprises a Universal Integrated Circuit Card (UICC).

In one embodiment, the SIM card comprises different sizes.

In one embodiment, the SIM card comprises a virtual SIM card.

In one embodiment, the SIM card is for at least one of LTE network, NR network, 3G network, 4G network, 5G network, 6G network, TN network, NTN network, URLLC network, IoT network, Intra-Vehicle Network, Industrial IoT network, broadcast network, unicast network, 3GPP network, or non-3GPP network.

In one embodiment, the first node has a transmitter and a receiver.

In one embodiment, the first node has one transmitter and two receivers.

In one embodiment, the first node has two transmitters and two receivers.

In one embodiment, the first node has an RRC connection with a transmitter of the first signaling.

In one embodiment, a transmitter of the first signaling is or belongs to the first network.

In one embodiment, there exists an RRC connection between the first node and the second network when the first node receives the first signaling.

In one embodiment, there does not exist an RRC connection between the first node and the second network before the first node receives a first signaling.

In one embodiment, the first node is in RRC_CONNECTED state relative to the first network.

In one embodiment, the first node is in RRC IDLE state relative to the second network.

In one embodiment, the first node is in RRC INACTIVE state relative to the second network.

In one embodiment, the first node supports interBandContiguousMRDC.

In one embodiment, the first node supports intraBandENDC-Support.

In one embodiment, the first node supports uplinkTxSwitching-OptionSupport-r16 of dualUL.

In one embodiment, the first node supports uplinkTxSwitching-OptionSupport-r16 of switchedUL.

In one embodiment, the first node supports MRDC.

In one embodiment, the first node supports NRDC.

In one embodiment, the first node is in RRC_CONNECTED state relative to a first network.

In one embodiment, the following concepts have the same meaning: RRC_CONNECTED state, RRC connection mode, being in RRC_CONNECTED state, having RRC connection, being in RRC_CONNECTED state, RRC_CONNECTED state and RRC_CONNECTED.

In one embodiment, the first node supports an SCG.

In one embodiment, the first node is configured with supporting an SCG.

In one embodiment, the first node is configured with an SCG before receiving the first signaling.

In one embodiment, the first network is an NR network.

In one embodiment, the second network is an NR network.

In one embodiment, the second network is an eUTRA network.

In one embodiment, the first network is different from the second network.

In one embodiment, the first network and the second network use different radio access technologies.

In one embodiment, a serving cell is or comprises a UE-camped cell. Executing a cell search comprises: a UE searches for a suitable cell of a selected Public Land Mobile Network (PLMN) or a Stand-alone Non-Public Network (SNPN), selects the suitable cell to provide available traffic, and monitors a control channel of the suitable cell, and this procedure is defined as camping on a cell; that is to say, a camped cell is a serving cell of the UE relative to the UE. It has the following advantages to camp on a cell in RRC idle state or RRC inactive state: enabling the UE to receive a system message from a PLMN or an SNPN; after registration, if the UE wishes to establish an RRC connection or continue a suspended RRC connection, the UE can achieve this by executing an initial access on a control channel of the camping cell; the network may page the UE, which enables the UE to receive Earthquake and Tsunami Warning System (ETWS) and Commercial Mobile Alert System (CMAS) notifications.

In one embodiment, for a UE in RRC_CONNECTED state not configured with carrier aggregation/dual connectivity (CA/DC), only one serving cell comprises a primary cell. For a UE in RRC_CONNECTED state configured with carrier aggregation/dual connectivity (CA/DC), a serving cell is used to indicate a cell set comprising a Special Cell (SpCell) and all sub-cells. A Primary Cell is a Master Cell Group (MCG) cell, which works at primary frequency, and the UE executes an initial connection establishment procedure or initiates a connection re-establishment on a primary cell. For dual connectivity operation, a special cell refers to a Primary Cell (PCell) of an MCG or a Primary SCG Cell (PSCell) of an SCG; if it is not a dual connectivity operation, an SpCell refers to a PCell.

In one embodiment, frequency at which a Secondary Cell (SCell) works is sub-frequency.

In one embodiment, individual content of an information element is called a field.

In one embodiment, a Multi-Radio Dual Connectivity (MR-DC) refers to a dual connectivity between an E-UTRA and an NR node, or a dual connectivity between two NR nodes.

In one embodiment, in MR-DC, a radio access node providing a control-plane connection to the core network is a master node, and the master node may be a master eNB, a master ng-eNB, or a master gNB.

In one embodiment, an MCG refers to, in MR-DC, a group of serving cells associated with a master node, comprising an SpCell, and optionally one or multiple SCells.

In one embodiment, a PCell is an SpCell of an MCG.

In one embodiment, a PSCell is an SpCell of an SCG.

In one embodiment, in MR-DC, a radio access node not providing control plane connectivity to the core network and providing extra resources to a UE is a secondary node; the secondary node can be an en-gNB, a secondary ng-eNB or a secondary gNB.

In one embodiment, in MR-DC, a group of serving cells associated with a secondary node is a Secondary Cell Group (SCG), comprising an SpCell and optionally, one or multiple SCells.

In one embodiment, the first signaling is an RRC message.

In one embodiment, the first signaling is an RRCReconfiguration message.

In one embodiment, an RRCReconfiguration message is a command used to modify an RRC connection, and information carried by the RRCReconfiguration message can be used for: measurement configuration, mobility control, radio resource configuration, and access-layer security configuration; where the radio resource configuration comprises configuration of a radio bearer, main configuration of MAC, and configuration of a physical channel; an RRCReconfiguration message is transmitted through SRB1 or SRB3, an occupied logical channel is a dedicated Control channel (DCCH), and a transmission direction is network transmitting to a UE; an RLC that transmits an RRCReconfiguration message adopts AM mode.

In one embodiment, the first node is a UE supporting DC.

In one embodiment, before receiving the first signaling, the first node is configured with an SCG by a transmitter of the first signaling.

In one embodiment, before receiving the first signaling, an SCG of the first node is activated.

In one embodiment, the first signaling comprises a first field.

In one embodiment, the first field configures the first gap set in the form of list.

In one embodiment, the first gap set comprises at least one gap.

In one embodiment, the first gap set comprises at most one aperiodic gap.

In one embodiment, the first gap set comprises at most two periodic gaps.

In one embodiment, a length of any gap in the first gap set does not exceed 20 ms.

In one embodiment, a name of the first field comprises gap.

In one embodiment, a name of the first field comprises MUSIM.

In one embodiment, the first field is MUSIM-GapConfig.

In one embodiment, whether the first field indicates an identity of the first gap is related to whether the first gap is an aperiodic gap; when the first gap is an aperiodic gap, the first field does not indicate an identity of the first gap; when the first gap is a periodic gap, the first field indicates an identity of the first gap.

In one embodiment, the first field is or comprises MUSIM-GapInfo.

In one embodiment, the first gap is a periodic slot.

In one embodiment, the first gap is an aperiodic slot.

In one embodiment, musim-GapRepetitionAndOffset comprised in the first field indicates a repeat cycle and offset of the first gap, and the first gap is a periodic gap.

In one embodiment, musim-GapLength comprised in the first field indicates the gap length of the first gap.

In one embodiment, starting-SFN comprised in the first field indicates the starting SFN of the first gap.

In one embodiment, startingSub-frame comprised in the first field indicates the starting sub-frame of the first gap.

In one embodiment, a candidate value of a length of any gap in the first gap set is one of 3 ms, 4 ms, 6 ms, 10 ms and 20 ms.

In one embodiment, the position of the first field in the first signaling refers to in which manner the first signaling comprises the first field.

In one embodiment, the position of the first field in the first signaling refers to a relation between the first field and the first signaling at cell level.

In one embodiment, the meaning of the phrase that the first field is a first level sub-item of the first signaling is: the first field does not belong to a part of any sub-level of the first signaling.

In one embodiment, the meaning of the phrase that the first field is a first level sub-item of the first signaling is: the first field is not comprised by any sub-level of the first signaling.

In one embodiment, when a first field is a first level sub-item of the first signaling, the first field is applied to at least MCG in an MCG and an SCG.

In one embodiment, when a first field is a first level sub-item of the first signaling, the first field is applied to only MCG in an MCG and an SCG.

In one embodiment, when a first field is a first level sub-item of the first signaling, the first field is applied to an MCG and an SCG in an MCG and an SCG.

In one embodiment, the meaning of the phrase that the first field is applied to at least MCG in an MCG and an SCG comprises: the first gap set is applied to at least MCG in an MCG and an SCG.

In one embodiment, the meaning of the phrase that the first field is applied to at least MCG in an MCG and an SCG comprises: the first gap set is for an MCG.

In one embodiment, the meaning of the phrase that the first field is applied to at least MCG in an MCG and an SCG comprises: the first gap set is for an MCG and an SCG.

In one embodiment, the meaning of the phrase that the first field is applied to at least MCG in an MCG and an SCG comprises: the first gap set only affects an MCG.

In one embodiment, the meaning of the phrase that the first field is applied to at least MCG in an MCG and an SCG comprises: the first node is not required to be in communications with an MCG within the first gap set.

In one embodiment, the meaning of the phrase that the first field is applied to at least MCG in an MCG and an SCG comprises: the first node is not required to monitor a signal of an MCG within the first gap set.

In one embodiment, the meaning of the phrase that the first field is applied to at least MCG in an MCG and an SCG comprises: the first gap set will affect an MCG and an SCG.

In one embodiment, the meaning of the phrase that the first field is applied to at least MCG in an MCG and an SCG comprises: the first node is not required to be in communications with an MCG and an SCG within the first gap set.

In one embodiment, the meaning of the phrase that the first field is applied to at least MCG in an MCG and an SCG comprises: the first node is not required to monitor a signal of an MCG and an SCG within the first gap set.

In one embodiment, the meaning of the phrase that the first field is applied to at least MCG in an MCG and an SCG comprises: the first node determines a start of any gap in the first gap set based on timing of an MCG.

In one embodiment, the meaning of the phrase that the first field is applied to at least MCG in an MCG and an SCG comprises: the first node determines a start of any gap in the first gap set based on timing of a PCell of an MCG.

In one embodiment, the meaning of the phrase that the first field is applied to at least MCG in an MCG and an SCG comprises: the first node performs an MUSIM operation in the first gap set of an MCG.

In one embodiment, the meaning of the phrase that the first field is applied to only SCG in an MCG and an SCG comprises: the first gap set is applicable to an SCG in an MCG and an SCG, but not to an MCG.

In one embodiment, the meaning of the phrase that the first field is applied to only SCG in an MCG and an SCG comprises: the first gap set is for an SCG.

In one embodiment, the meaning of the phrase that the first field is applied to only SCG in an MCG and an SCG comprises: the first gap set only affects an SCG and does not affect an MCG.

In one embodiment, the meaning of the phrase that the first field is applied to only SCG in an MCG and an SCG comprises: the first node is not required to be in communications with an SCG within the first gap set.

In one embodiment, the meaning of the phrase that the first field is applied to only SCG in an MCG and an SCG comprises: the first node is not required to monitor a signal of an SCG within the first gap set.

In one embodiment, the meaning of the phrase that the first field is applied to only SCG in an MCG and an SCG comprises: the first node determines a start of any gap in the first gap set based on timing of an SCG.

In one embodiment, the meaning of the phrase that the first field is applied to only SCG in an MCG and an SCG comprises: the first node determines a start of any gap in the first gap set based on timing of a PSCell of an SCG.

In one embodiment, the meaning of the phrase that the first field is applied to only SCG in an MCG and an SCG comprises: the first node executes an MUSIM operation in the first gap set of an SCG.

In one embodiment, the advantage of the above methods is that timing of gaps in a first gap set depends on an MCG or an SCG, when timing of an MCG and an SCG is not synchronized, if it cannot be determined whether the first gap set is for the MCG or the SCG, there will be configuration ambiguity, leading to unpredictable errors, while the above methods can avoid such uncertainty.

In one embodiment, the first node receives a third signaling, the third signaling comprises a second field, the third signaling is an RRCReconfiguration message, the third signaling configures a second gap set, and the second gap set is for only SCG in an MCG and an SCG.

In one subembodiment of the embodiment, the second gap set comprises at least a second gap.

In one subembodiment of the above embodiment, the meaning of the phrase that the third signaling configures a second gap set comprises: the third field indicates a gap length, a starting SFN and a starting sub-frame of the second gap.

In one subembodiment of the above embodiment, the third field is not a first level sub-item of the third signaling.

In one subembodiment of the embodiment, the third field belongs to the first position set.

In one subembodiment of the embodiment, the first gap set is for an MCG.

In one subembodiment of the above embodiment, a name of the third field comprises musim.

In one subembodiment of the above embodiment, the third field is musim-gapconfig.

In one subembodiment of the embodiment, the second gap set is for an MUSIM.

In one subembodiment of the embodiment, the second gap set is used for an MUSIM operation.

In one subembodiment of the embodiment, the second gap set at most comprises an aperiodic gap.

In one subembodiment of the embodiment, the second gap set at most comprises two aperiodic gaps.

In one subembodiment of the embodiment, the second gap set and a union set of the first gap set at most comprise an aperiodic gap.

In one subembodiment of the embodiment, the second gap set and a union set of the first gap set at most comprise two aperiodic gaps.

In one embodiment, the first signaling and the third signaling are transmitted at the same time.

In one embodiment, the first signaling and the third signaling are transmitted not at the same time.

In one embodiment, the first signaling and the third signaling are a same signaling.

In one embodiment, the first signaling and the third signaling are different signaling.

In one embodiment, the first position set comprises at least one position.

In one embodiment, the first position set comprises an item other than a first level sub-item of the first signaling.

In one embodiment, a position comprised in the first position set belongs to cellgroupconfig used to configure an SCG, and the cellgroupconfig used to configure an SCG belongs to the first signaling.

In one embodiment, the first position set comprises all positions in cellgroupconfig in an RRCReconfiguration message.

In one embodiment, the first position set comprises all positions in SpCellConfig in an RRCReconfiguration message.

In one subembodiment of the above embodiment, the SpCellConfig is used to configure an MCG.

In one embodiment, the first position set comprises MRDC-SecondaryCellGroupConfig in an RRCReconfiguration message.

In one embodiment, the first position set comprises OtherConfig in an RRCReconfiguration message.

In one embodiment, the first position set comprises SecondaryCellGroup in an RRCReconfiguration message.

In one embodiment, the first position set comprises RRCReconfiguration encapsulated in a container in an RRCReconfiguration message.

In one embodiment, the first position set comprises RRCReconfiguration for a target cell of CHO.

In one embodiment, the first position set comprises a field used to configure a cell group.

In one subembodiment of the embodiment, the cell group is an SCG.

In one subembodiment of the embodiment, a cell associated with the cell group is a PSCell.

In one subembodiment of the embodiment, the field used to configure a cell group is a field in an RRCReconfiguration message.

In one embodiment, the first position set comprises any position within a cell in an RRCReconfiguration message.

In one embodiment, the first position set comprises any position within a field in an RRCReconfiguration message.

In one embodiment, the first gap set is for MUSIM.

In one embodiment, the first gap set is used for an MUSIM operation.

In one embodiment, the first gap set is used for an operation for a network other than a current network.

In one embodiment, the first gap set is used for an operation of a network corresponding to an SIM card other than an SIM card of the current network.

In one embodiment, the first gap set is used for multi-SIM card operation.

In one embodiment, whether the first gap set is applied to an SCG is unrelated to whether an SCG of the first node is activated.

In one embodiment, when the first node receives the first signaling, an SCG of the first node is in an active state.

In one embodiment, when the first node receives the first signaling, an SCG of the first node is in a de-active state.

In one embodiment, whether the first gap set is applied to an SCG is related to whether an SCG of the first node is in an active state, only when an SCG of the first node is in an active state, the first gap set is applied to an SCG.

In one embodiment, whether the first gap set is applied to an SCG is related to whether an SCG of the first node is in an active state, only when an SCG of the first node is in a de-active state, the first gap set is applied to an SCG.

In one embodiment, whether the first gap set is applied to an SCG is related to whether an SCG of the first node is in a de-active state, only when an SCG of the first node is in a de-active state, the first node can request a gap used for MUSIM for an SCG.

In one embodiment, whether the first gap set is applied to an SCG is related to whether an SCG of the first node is in a de-active state, only when an SCG of the first node is in an active state, the first node can request a gap used for MUSIM for an SCG.

Embodiment 2

Figure 2:
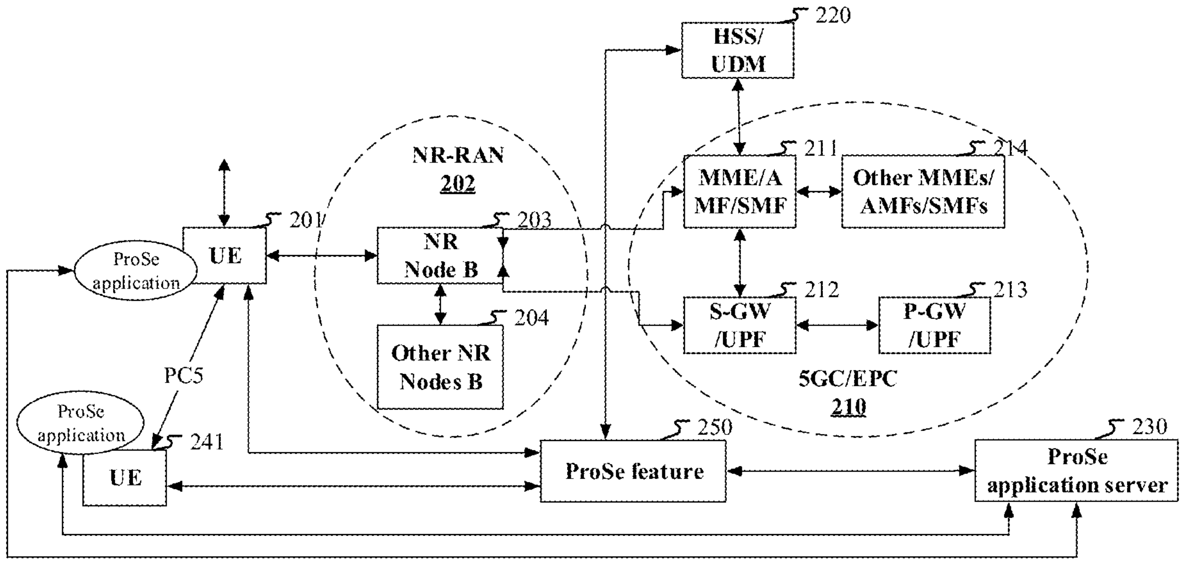
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application is a UE 201.

In one embodiment, the second node in the present application is a gNB 203.

In one embodiment, a radio link from the UE 201 to NR node B is uplink.

In one embodiment, a radio link from the NR node B to the UE 201 is downlink.

In one embodiment, the UE 201 supports relay transmission.

In one embodiment, the UE 201 comprises a mobile phone.

In one embodiment, the UE 201 is a vehicle comprising a car.

In one embodiment, the UE 201 supports multiple SIM cards.

In one embodiment, the gNB 203 is a base station.

In one embodiment, the gNB 203 is a flight platform.

In one embodiment, the gNB 203 is satellite.

Embodiment 3

Figure 3:
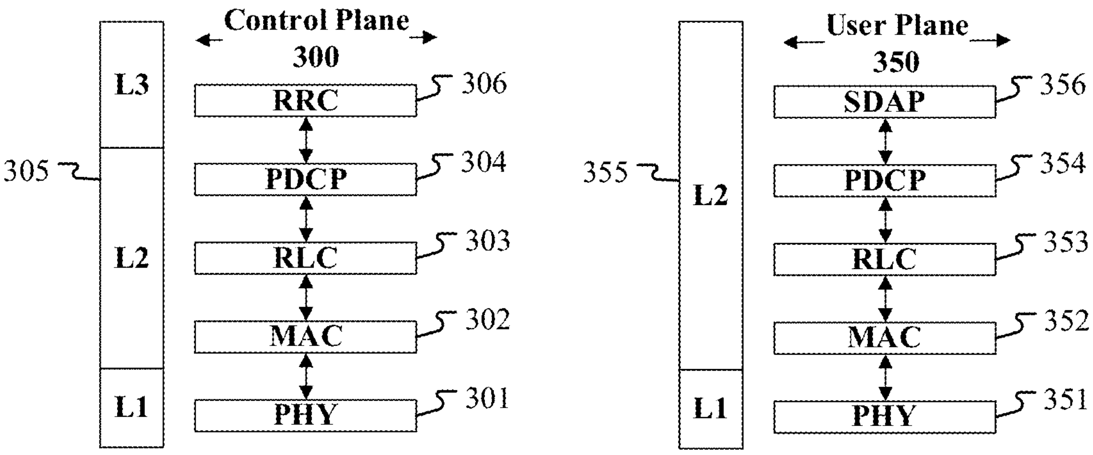
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. PC5 Signaling Protocol (PC5-S) sublayer 307 is responsible for the processing of signaling protocol at PC5 interface. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in the figure, the first node may comprise several higher layers above the L2 305. also comprises a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first message in the present application is generated by the RRC 306.

In one embodiment, the first signaling in the present application is generated by the RRC 306.

In one embodiment, the second signaling in the present application is generated by the RRC 306.

In one embodiment, the third signaling in the present application is generated by the RRC 306.

Embodiment 4

Figure 4:
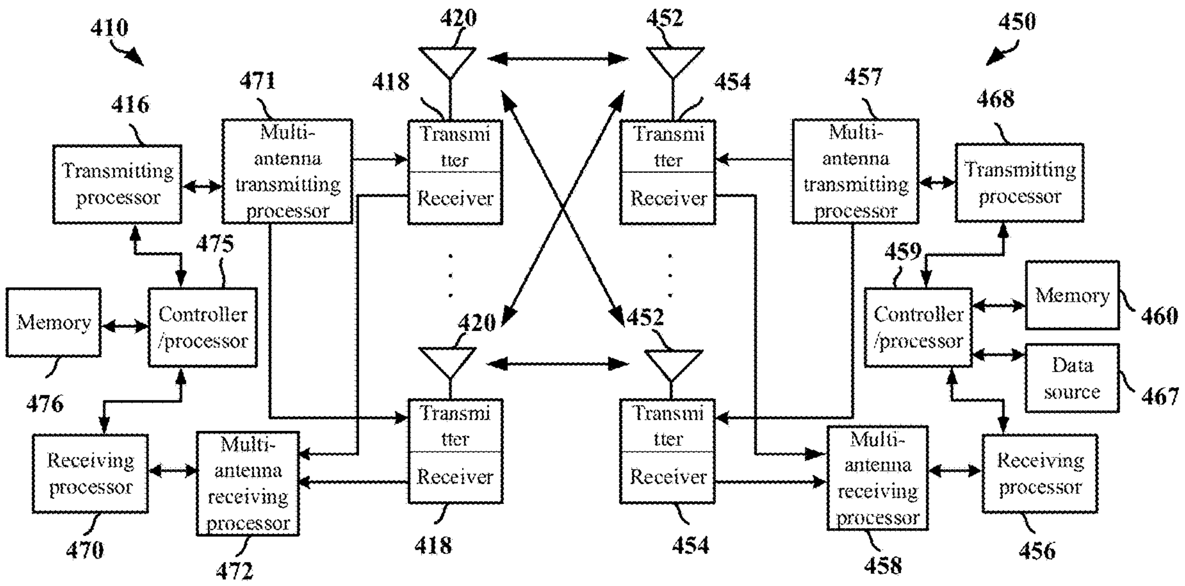
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, optionally may also comprise a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, optional can also comprise a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, herein, the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first signaling, the first signaling comprises a first field, the first field configures a first gap set; a position of the first field in the first signaling is used to determine whether the first gap set is applied to an MCG; herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, the first communication device 450 comprises at least one processor and at least one memory. a memory that stores a computer readable instruction program. The computer readable instruction program generates an action when executed by at least one processor. The action includes: receiving a first signaling, the first signaling comprising a first field, the first field configuring a first gap set; a position of the first field in the first signaling being used to determine whether the first gap set is applied to an MCG; herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signaling, the first signaling comprises a first field, the first field configures a first gap set; a position of the first field in the first signaling is used to determine whether the first gap set is applied to an MCG; herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, the second communication device 410 comprises a memory that stores a computer readable instruction program. The computer readable instruction program generates an action when executed by at least one processor. The action includes: transmitting a first signaling, the first signaling comprising a first field, the first field configuring a first gap set; a position of the first field in the first signaling being used to determine whether the first gap set is applied to an MCG; herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, the first communication device 450 corresponds to a first node in the present application.

In one embodiment, the first communication device 450 is a UE.

In one embodiment, the first communication device 450 is a vehicle terminal.

In one embodiment, the second communication device 450 is a relay.

In one embodiment, the second communication device 450 is a satellite.

In one embodiment, the second communication device 450 is an aircraft.

In one embodiment, the second communication device 410 is a base station.

In one embodiment, the second communication device 410 is a relay.

In one embodiment, the second communication device 410 is a satellite.

In one embodiment, the second communication device 410 is an aircraft.

In one embodiment, the receiver 454 (comprising the antenna 452), the receiving processor 456 and the controller/processor 459 are used to receive the first signaling in the present application.

In one embodiment, the receiver 454 (comprising the antenna 452), the receiving processor 456 and the controller/processor 459 are used to receive the second signaling in the present application.

In one embodiment, the receiver 454 (comprising the antenna 452), the receiving processor 456 and the controller/processor 459 are used to receive the third signaling in the present application.

In one embodiment, the transmitter 454 (comprising antenna 452), the transmitting processor 468 and the controller/processor 459 are used to transmit the first message in the present application.

In one embodiment, the transmitter 418 (comprising the antenna 420), the transmitting processor 416 and the controller/processor 475 are used to transmit the first signaling in the present application.

In one embodiment, the transmitter 418 (comprising the antenna 420), the transmitting processor 416 and the controller/processor 475 are used to transmit the second signaling in the present application.

In one embodiment, the transmitter 418 (comprising the antenna 420), the transmitting processor 416 and the controller/processor 475 are used to transmit the third signaling in the present application.

In one embodiment, the receiver 418 (comprising the antenna 420), the receiving processor 470 and the controller/processor 475 are used to receive the first message in the present application.

Embodiment 5

Figure 5:
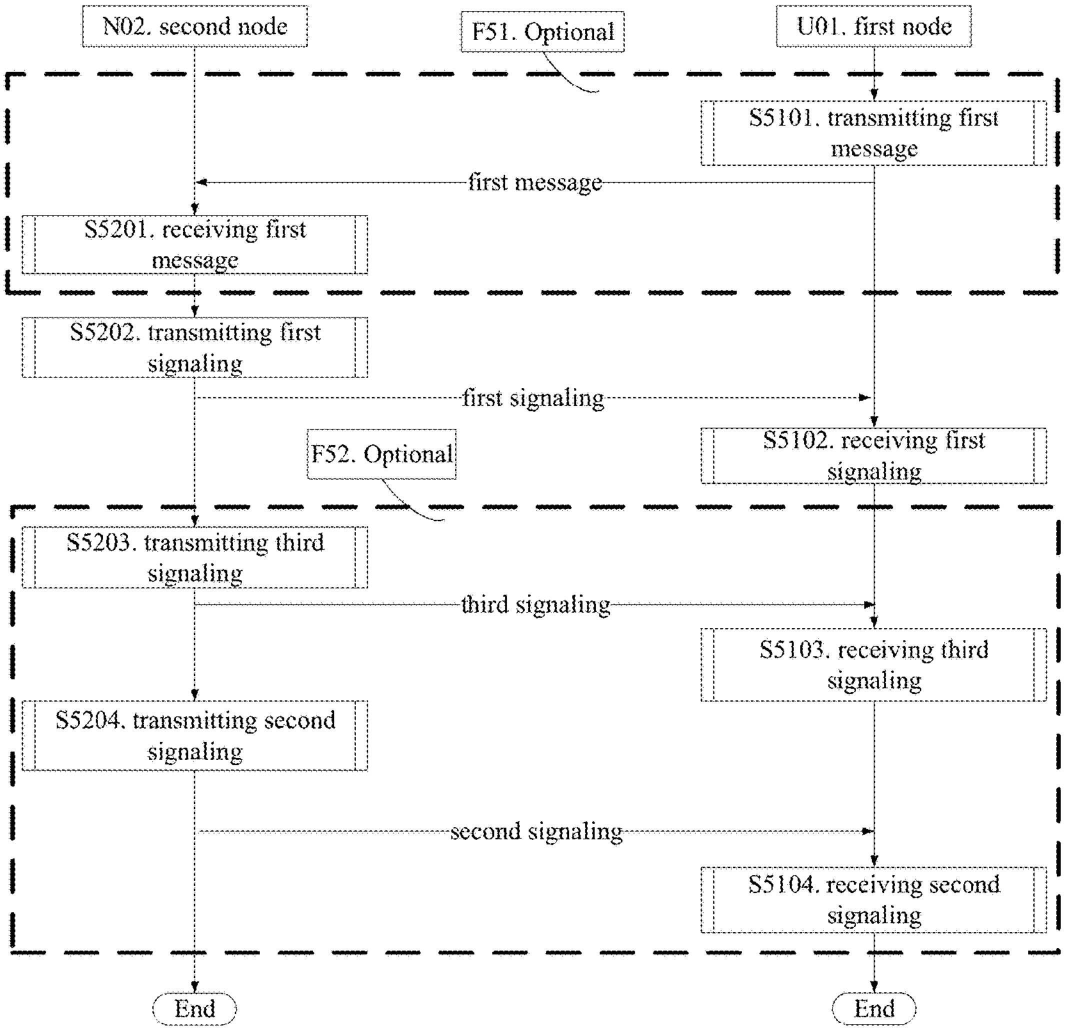
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, U01 corresponds to a first node in the present application. It is particularly underlined that the order illustrated in the embodiment does not put constraints over sequences of signal transmissions and implementations and steps in F51 and F52 are optional.

The first node U01 transmits a first message in step S5101; receives a first signaling in step S5102; receives a third signaling in step S5103; and receives a second signaling in step S5104.

The second node N02 receives a first message in step S5201; transmits a first signaling in step S5202; transmits a third signaling in step S5203; and transmits a second signaling in step S5204.

In embodiment 5, the first signaling comprises a first field, the first field configures a first gap set; a position of the first field in the first signaling is used to determine whether the first gap set is applied to an MCG; herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, the first node U01 is a UE.

In one embodiment, the first node U01 is a Remote U2N UE.

In one embodiment, the first node U01 is a relay.

In one embodiment, the second node N02 belongs to the first network.

In one embodiment, the second node N02 is a network.

In one embodiment, the second node N02 is a base station.

In one embodiment, the second node N02 is a relay.

In one embodiment, the second node N02 is a satellite.

In one embodiment, the second node N02 is an NTN.

In one embodiment, the second node N02 is a TN.

In one embodiment, the second node N02 is a serving cell of the first network of the first node U01.

In one embodiment, the second node N02 is a cell group of the first network of the first node U01.

In one embodiment, the second node N02 is a PCell of the first network of the first node U01.

In one embodiment, the second node N02 is an MCG of the first network of the first node U01.

In one embodiment, the second node N02 is an SpCell of the first network of the first node U01.

In one embodiment, the first node U01 has two SIM cards, comprising a first SIM card and a second SIM card.

In one embodiment, the two SIM cards of the first node U01 correspond to two different PLMNs.

In one embodiment, the first SIM card is an SIM card for the second node N02; the second SIM card is an SIM card for a node and a network other than the second node N02.

In one embodiment, the first SIM card is a SIM card for the second node N02 or a network of the second node N02; the second SIM card is a SIM card for a node other than the second node N02 or a network other than a network of the second node N02.

In one embodiment, the first SIM card is for the first network; the second SIM card is for the second network.

In one embodiment, there exists an RRC link between the first node U01 and the N02.

In one embodiment, the multi-SIM in the present application is represented by MUSIM.

In one embodiment, the first message is an RRC message.

In one embodiment, the first message is UEAssistanceInformation.

In one embodiment, the first message comprises MUSIM-Assistance.

In one embodiment, the first message comprises MUSIM-GapPreferenceList.

In one embodiment, the first message indicates that the first node U01 supports providing MUSIM auxiliary information, and the MUSIM auxiliary information comprises MUSIM gap preference and related MUSIM gap configuration.

In one embodiment, the first message is transmitted before the first signaling.

In one embodiment, the first message is used to request an aperiodic gap starting at a first frame and a first sub-frame for MUSIM;

herein, the starting SFN of the first gap indicated by the first field is the first frame, the starting sub-frame of the first gap indicated by the first field is the first sub-frame, and the first gap is an aperiodic gap; the gap length of the first gap indicated by the first field belongs to a first gap length set, and the first gap length set only comprises and 20 ms.

In one embodiment, the second node N02 either rejects or does not respond to the first message, or can only be configured with an aperiodic gap starting at the first frame and the first sub-frame.

In one embodiment, the first message is used to request an aperiodic gap with a gap length of the first length starting at a first frame and a first sub-frame for MUSIM.

In one embodiment, the length of the first gap is the first length.

In one embodiment, the first length belongs to the first gap length set.

In one embodiment, the first gap length set comprises and only comprises two elements: 10 ms and 20 ms.

In one embodiment, the first gap is an aperiodic gap starting at a first frame and a first sub-frame for MUSIM requested by the first message.

In one embodiment, the meaning of the phrase that the first message is used to request an aperiodic gap starting at a first frame and a first sub-frame for MUSIM is: a field of the first message whose name comprises MUSIM is used to request an aperiodic gap starting at a first frame and a first sub-frame for MUSIM.

In one embodiment, the first message indicates whether the requested aperiodic gap starting at the first frame and the first sub-frame for MUSIM is applied to an MCG or an SCG.

In one embodiment, the first message explicitly indicates whether the requested aperiodic gap starting at the first frame and the first sub-frame for MUSIM is applied to an MCG or an SCG.

In one embodiment, the first message does not explicitly indicate that the requested aperiodic gap starting at the first frame and the first sub-frame for MUSIM applies to an MCG, and the aperiodic gap starting at the first frame and the first sub-frame for MUSIM requested by the first message is applied to an SCG.

In one embodiment, the first message does not explicitly indicate that the requested aperiodic gap starting at the first frame and the first sub-frame for MUSIM is applied to an SCG, and the aperiodic gap starting at the first frame and the first sub-frame for MUSIM requested by the first message is applied to an MCG.

In one embodiment, the first message does not explicitly indicate a timing reference of the requested aperiodic gap starting at the first frame and the first sub-frame for MUSIM, and the timing reference is used to determine whether the aperiodic gap starting at the first frame and the first sub-frame for MUSIM is applied to an MCG or an SCG.

In one subembodiment of the above embodiment, when the timing reference is a PCell, the aperiodic gap starting at the first frame and the first sub-frame for MUSIM is applied to an MCG.

In one subembodiment of the above embodiment, when the timing reference is a PSCell, the aperiodic gap starting at the first frame and the first sub-frame for MUSIM is applied to an SCG.

In one subembodiment of the above embodiment, when the timing reference is an SSB or a PCI of a PCell, the aperiodic gap starting at the first frame and the first sub-frame for MUSIM is applied to an MCG.

In one subembodiment of the above embodiment, when the timing reference is an SSB or a PCI of a PSCell, the aperiodic gap starting at the first frame and the first sub-frame for MUSIM is applied to an SCG.

In one embodiment, a second signaling is received after the first signaling.

In one embodiment, the second signaling comprises a second field, and the second field is used to indicate releasing the first gap.

In one subembodiment of the above embodiment, the first gap is a periodic gap, and the second field comprises an identity of the first gap.

In one subembodiment of the above embodiment, the first gap is an aperiodic gap, and the second field indicates that a released gap is an aperiodic gap, so the first gap is released.

In one subembodiment of the above embodiment, the first gap is an aperiodic gap, and the second field comprises an identity of the first gap.

In one embodiment, the second signaling is RRCReconfiguration.

In one embodiment, the position of the first field in the first signaling belongs to the first position set, and whether the first gap is applied to an MCG or an SCG is unrelated to a position of the second field in the second signaling.

In one subembodiment of the above embodiment, the second field is a first level sub-item of the second signaling.

In one subembodiment of the above embodiment, the second field is not a first level sub-item of the second signaling.

In one embodiment, the position of the first field in the first signaling belongs to the first position set, and the second field is a first level sub-item of the second signaling.

In one embodiment, both the third signaling and the first signaling are a same RRC message.

In one embodiment, both the third signaling and the first signaling are RRCReconfiguration messages with different transmission time.

In one embodiment, a transmission of the third signaling can be earlier than the first signaling and can be later than the first signaling.

In one embodiment, an aperiodic gap for MUSIM is only applicable to an MCG.

In one embodiment, an aperiodic gap for MUSIM is only applicable to an SCG.

In one embodiment, a periodic gap for MUSIM is only applicable to an MCG.

In one embodiment, a periodic gap for MUSIM is only applicable to an SCG.

In one embodiment, accompanying a transmission of the first message, the first node U01 starts a first timer, and auxiliary information for MUSIM is only transmitted when the first timer is not running.

In one subembodiment of the above embodiment, the first timer is for an MCG, and an aperiodic gap starting at a first frame and a first sub-frame for MUSIM requested by the first message is for an MCG.

In one subembodiment of the above embodiment, the first timer is for an SCG, and an aperiodic gap starting at a first frame and a first sub-frame for MUSIM requested by the first message is for an SCG.

In one subembodiment of the above embodiment, the first timer is unrelated to whether an aperiodic gap starting at a first frame and a first sub-frame for MUSIM requested by the first message is for an MCG or an SCG.

In one subembodiment of the above embodiment, an aperiodic gap starting at a first frame and a first sub-frame for MUSIM requested by the first message can be for an MCG or an SCG.

In one embodiment, the first node U01 performs an MUSIM operation within a first gap set, and the MUSIM operation belongs to the first operation set.

In one embodiment, the first node U01, within the first gap set, executes at least one operation in a first operation set, and the first operation set comprises: cell identification and measurement, paging monitoring, SIB acquisition, and on-demand acquisition of system information;

herein, the first operation set is for a target network, and the target network is a network other than a transmitter of the first signaling.

In one subembodiment of the above embodiment, the target network is for a second network.

In one subembodiment of the above embodiment, the target network is for network corresponding to a second SIM card.

In one subembodiment of the above embodiment, the operation of acquiring system information on demand comprises transmitting a signal requesting system information during a random access process.

In one embodiment, the first node U01, after receiving the first signaling, determines an occurrence of RLF in a first cell group, and as a response to the behavior of determining an occurrence of RLF in a first cell group, releases the first gap set;

herein, a cell group to which the first gap set is applied comprises the first cell group.

In one subembodiment of the embodiment, the first cell group is an MCG.

In one subembodiment of the embodiment, the first cell group is an SCG.

In one subembodiment of the embodiment, the behavior of determining that RLF occurs in a first cell group comprises: detecting that link quality of the first cell group is less than a first threshold.

In one subembodiment of the embodiment, the behavior of determining that an RLF occurs in a first cell group comprises: detecting that link quality of the first cell group is less than a first threshold and lasts a certain time.

In one subembodiment of the embodiment, the behavior of determining that an RLF occurs in a first cell group comprises: T310 timer of the first cell group is expired.

In one subembodiment of the embodiment, the behavior of determining that an RLF occurs in a first cell group comprises: an RLC for the first cell group reaches a maximum number of retransmissions.

In one subembodiment of the embodiment, the behavior of determining that an RLF occurs in a first cell group comprises: T304 for the first cell group is expired.

In one subembodiment of the embodiment, the behavior of determining that an RLF occurs in a first cell group comprises: random access for the first cell group fails.

In one subembodiment of the embodiment, the behavior of determining that an RLF occurs in a first cell group comprises: failure occurs in MAC layer for the first cell group.

In one embodiment, the phrase that as a response to the behavior of determining an occurrence of RLF in a first cell group, releasing the first gap set comprises: when it is determined RLF occurs in a first cell group, immediately releasing the first gap set.

In one embodiment, the phrase that as a response to the behavior of determining an occurrence of RLF in a first cell group, releasing the first gap set comprises: after determining that RLF occurs in the first cell group, releasing the first gap set.

In one embodiment, the phrase that as a response to the behavior of determining an occurrence of RLF in a first cell group, releasing the first gap set comprises: releasing the first gap set during an execution of RRC re-establishment after determining that RLF occurs in a first cell group.

In one embodiment, the meaning of releasing the first gap set is: releasing all gaps in the first gap set.

In one embodiment, the meaning of releasing the first gap set comprises: no longer applying the first gap set to an MCG, and no longer applying the first gap set to an SCG.

Embodiment 6

Embodiment 6 illustrates a schematic diagram of a first gap according to one embodiment of the present application, as shown in FIG. 6.

In one embodiment, a first gap is a gap in a first gap set.

In one embodiment, a first gap is any gap in a first gap set.

In one embodiment, a length of the first gap is limited.

In one embodiment, the first gap starts at t0 time, and ends at t1 time.

In one embodiment, the first gap is an aperiodic slot.

In one embodiment, the first gap is a periodic gap, the first gap comprises more than one discrete sub-gap, a gap length of any sub-gap comprised in the first gap is the same, and a time interval between any two adjacent sub-gaps comprised in the first gap is equal.

In one embodiment, FIG. 6 only illustrates a sub-gap that starts at t0 and ends at t1 comprised in the first gap.

In one embodiment, a value range of a gap length of the first gap is related to whether the first gap is an aperiodic gap or a periodic gap.

In one subembodiment of the embodiment, when the first gap is an aperiodic gap, a gap length of the first gap belongs to a first gap length set, and the first gap length set comprises 10 milliseconds (ms) and 20 ms.

In one embodiment, a starting SFN of the first gap is a frame number of a system frame to which a start of the first gap belongs.

In one embodiment, a starting SFN of the first gap is a frame number of a system frame corresponding to a start of the first gap.

In one embodiment, a frame number of a system frame to which t0 time belongs is a starting SFN of the first gap.

In one embodiment, a starting sub-frame of the first gap is a sub-frame to which a start of the first gap belongs.

In one embodiment, a starting sub-frame of the first gap is a sub-frame corresponding to a start of the first gap.

In one embodiment, a sub-frame to which t0 belongs is a starting sub-frame of the first gap.

In one embodiment, a system frame comprises 10 sub-frames.

In one embodiment, a system frame is 10 ms.

In one embodiment, a sub-frame is 1 ms.

In one embodiment, gaps comprised in the first gap set can be overlapping, or orthogonal.

In one embodiment, when the first gap is applied to an MCG, a starting SFN and a starting sub-frame of the first gap is for timing of an MCG or a PCell.

In one embodiment, when the first gap is applied to an MCG and SCG, a starting SFN and a starting sub-frame of the first gap is for timing of an MCG or a PCell.

In one embodiment, when the first gap is applied to an SCG, a starting SFN and a starting sub-frame of the first gap is for timing of an MCG or a PCell.

In one embodiment, when the first gap is applied to an SCG, a starting SFN and a starting sub-frame of the first gap is for timing of an SCG or a PSCell.

Embodiment 7

Embodiment 7 illustrates a schematic diagram of a position according to one embodiment of the present application, as shown in FIG. 7.

Field1, field2, field11, field12, field21 in FIG. 7 are fields.

A format of an RRC message is based on the relevant specifications of ISO ASN. 1.

InformationElement1, InformationElement2, InformationElement11, InformationElement12 in FIG. 7 are RRC IEs.

In one embodiment, an RRC message comprises one or multiple RRC Information Elements (RRC IEs), such as RRCMessage-IEs in FIG. 7.

In one embodiment, RRCMessage-IEs in FIG. 7 is an RRC IE.

In one embodiment, RRCMessage-IEs in FIG. 7 is any IE of an RRC message.

In one embodiment, an RRC IE comprises one or multiple fields, such as field1 and field2 comprised in RRCMessage-IEs in FIG. 7, such as Information.

In one embodiment, a field in FIG. 7 is applicable to the first field in the present application.

In one embodiment, a field in FIG. 7 is applicable to the second field in the present application.

In one embodiment, a field in FIG. 7 is applicable to the third field in the present application.

In one embodiment, a value of a field in an RRC message can be an RRC IE, such as in FIG. 7, a value of field1 is InformationElement1.

In one embodiment, a field in an RRC message bears or carries an RRC IE, such as in FIG. 7, field1 bears or carries InformationElement1.

In one embodiment, a field in an RRC message corresponds to an RRC IE, such as in FIG. 7, field1 corresponds to InformationElement1.

In one embodiment, in an RRC message, different fields can correspond to or carry or take a value of a same RRC IE, such as both field11 and field 21 are set as InformationElement11.

In one embodiment, an IE in an RRC message can comprise one or multiple levels.

In one embodiment, an IE in an RRC message can comprise one or multiple sub-IEs.

In one embodiment, an IE in an RRC message can comprise one or multiple grandchild-IEs, and/or deeper level IEs.

In one embodiment, an IE in an RRC message can comprise one or multiple subfields and/or grandchild-fields, such as field1 being a first level sub-item of RRCMessage-IEs and field11 being a second level sub-item of an RRC-Message-IE; a sub-field of an IE in an RRC message can also comprise its own first level sub-field or second level sub-field, and so on.

In one embodiment, RRCMessage-IEs in FIG. 7 is applicable to the first signaling.

In one embodiment, RRCMessage-IEs in FIG. 7 is applicable to the second signaling.

In one embodiment, RRCMessage-IEs in FIG. 7 is applicable to the third signaling.

In one embodiment, an RRC IE beared or carried by the first field is MUSIM-GapConfig-r17.

In one embodiment, the first field is or comprises MUSIM-GapConfig.

In one embodiment, the first field is or comprises musim-GapConfig-r17.

In one embodiment, a sub-item of an RRC IE is a first level sub-item comprised in the RRC IE.

In one embodiment, a grandchild-item of an RRC IE is a second level sub-item comprised in the RRC IE.

In one embodiment, a sub-item of a grandchild-item of an RRC IE is a third level sub-item comprised in the RRC IE.

In one embodiment, a field in FIG. 7 is applicable to a first message in the present application.

In one embodiment, a first level sub-item of an RRC message refers to a sub-item of the RRC message not belonging to any sub-item of an RRC message.

In one embodiment, a first level sub-item of any RRC message refers to a sub-item not belonging to any sub-item of any RRC message.

In one embodiment, a first level sub-item of any RRC message is a sub-item of any RRC message and the first level sub-item does not belong to any sub-item of any RRC message.

In one embodiment, the first field being a first level sub-item of the first signaling refers to: the first field belongs to the first signaling but does not belong to any field of the first signaling.

In one embodiment, the first field not being a first level sub-item of the first signaling refers to: the first field belongs to a filed in the first signaling.

In one embodiment, the first field belonging to a first position set refers to: the first field belongs to a filed in the first signaling.

In one embodiment, the first field belonging to a first position set refers to: the first field is a second level sub-item, a third level sub-item, or a sub-item below the third level of the first signaling.

In one embodiment, the first field belonging to a first position set refers to: the first field is an N-th level sub-item of the first signaling, where N is a positive integer greater than 1.

In one embodiment, an RRC message in Embodiment 7 is applicable to the first signaling, second signaling, and third signaling in the present application.

In one embodiment, field1, field2, field11, field12, and field21 in FIG. 7 are applicable to the first field.

In one embodiment, RRCMessage-Ies in FIG. 7 is the first signaling, and if the first field is or corresponds to field1 or field2 in FIG. 7, the first field is a first level sub-item of the first signaling; if the first field is or corresponds to field11 or field12 or field**2*l* in FIG. 7**, then the first field belongs to the first position set.

In one embodiment, the first position set comprises: field11, field12 and field21.

In one embodiment, the first position set comprises a second level sub-item of the first signaling.

In one embodiment, the first position set comprises an N-th level sub-item of the first signaling, N being a positive integer greater than 1.

Embodiment 8

Embodiment 18 illustrates a schematic diagram of a gap according to one embodiment of the present application, as shown in FIG. 8.

In one embodiment, a first node uses an MCG and an SCG, and timing of the MCG and the SCG is not synchronized.

In one embodiment, a time unit in FIG. 8 comprises a frame.

In one embodiment, a time unit in FIG. 8 comprises a sub-frame.

In one embodiment, a time unit in FIG. 8 comprises a slot.

In one embodiment, a time unit in FIG. 8 comprises a symbol.

In one embodiment, a first node needs to execute MUSIM operations within a certain period of time, i.e. the required gap in FIG. 8, and the first node requests a gap for MUSIM.

In one embodiment, the required gap is for a second network.

In one embodiment, the required gap is for a network corresponding to a second SIM card.

In one embodiment, the required gap belongs to continuous k+1 time units of MCG from i to i+k.

In one embodiment, a minimum time unit of an MCG comprising the required gap is continuous k+1 time units from i to i+k.

In one embodiment, a starting frame of a gap for MUSIM requested by the first node is a frame corresponding to an i-th time unit, and a starting sub-frame of a gap for MUSIM requested by the first node is a sub-frame corresponding to an i-th time unit.

In one embodiment, a gap length of a gap for MUSIM requested by the first node is a time corresponding to k+1 time unit.

In one embodiment, a value of k is a positive integer.

In one embodiment, the first node requests a gap for MUSIM through a first message.

In one embodiment, the first message indicates that the gap of the requested MUSIM is for an MCG.

In one subembodiment of the embodiment, the first gap is applied to an MCG.

In one subembodiment of the embodiment, the first gap is applied to an SCG.

In one subembodiment of the embodiment, the first gap is applied to only SCG in an MCG and an SCG.

In one embodiment, the required gap belongs to continuous m+1 time units of SCG from j to i+m.

In one embodiment, a minimum time unit of an SCG comprising the required gap is continuous m+1 time units from j to j+m.

In one embodiment, a starting frame of a gap for MUSIM requested by the first node is a frame corresponding to an j-th time unit, and a starting sub-frame of a gap for MUSIM requested by the first node is a sub-frame corresponding to an j-th time unit.

In one embodiment, a gap length of a gap for MUSIM requested by the first node is a time corresponding to m+1 time units.

In one embodiment, a value of m is a positive integer.

In one embodiment, the first node requests a gap for MUSIM through a first message.

In one embodiment, the gap in the first message indicates that the requested MUSIM is for an SCG.

In one subembodiment of the embodiment, the first gap is applied to an SCG.

In one subembodiment of the embodiment, the first gap is applied to only SCG in an MCG and an SCG.

In one embodiment, a gap for MUSIM requested by the first message is based on SCG timing, and the first gap indicated by the first signaling is based on timing of an MCG.

In one subembodiment of the embodiment, the gap for MUSIM requested by the first message is an aperiodic gap, and the first gap is an aperiodic gap.

In one subembodiment of the embodiment, the first message indicates that the requested gap for MUSIM starts from a time unit i of an MCG; the starting SFN and/or the starting sub-frame of the first gap are SFN and/or sub-frame of time unit j of an SCG.

In one subembodiment of the embodiment, the gap for MUSIM requested by the first message is a periodic gap, and the first gap is a periodic gap.

In one embodiment, the first gap is a response to a gap for MUSIM requested by the first message.

In one embodiment, the first gap is an agreed gap in gaps requested by the first message for MUSIM.

In one embodiment, advantage of the above methods is that a requested gap and a configured gap are accurately timed, avoiding unnecessary misunderstandings or deviations.

In one embodiment, advantage of the above methods is that since the timing of an MCG and an SCG is not synchronized, and a number of time unit(s) used by the MCG and the SCG to cover the required slots may be different, so that the UE can select a cell group with less data to request a gap, which can save resources.

Embodiment 9

Figure 9:
FIG. 9 illustrates a schematic diagram of a first message being used to request an aperiodic gap starting at a first frame and a first sub-frame for MUSIM according to one embodiment of the present application.

Embodiment 9 illustrates a schematic diagram of a first message being used to request an aperiodic gap starting at a first frame and a first sub-frame for MUSIM according to one embodiment of the present application, as shown in FIG. 9.

In one embodiment, the first message is an uplink RRC message.

In one embodiment, the first message comprises a UEAssistanceInformation message.

In one embodiment, the first message comprises MUSIM-Assistance-r17.

In one embodiment, the first message comprises musim-GapPreferenceList-r17.

In one embodiment, the first message comprises MUSIM-GapInfo.

In one embodiment, the first message comprises MUSIM-GapInfo-r17.

In one embodiment, MUSIM Gapinfo comprised in the first message indicates configuration of the requested gap for MUSIM.

In one embodiment, MUSIM GapInfo comprised in the first message comprises a starting SFN of the requested gap for MUSIM.

In one subembodiment of the embodiment, a musim-Starting-SFN-AndSub-frame field in MUSIM-GapInfo comprised in the first message indicates the first frame and the first sub-frame.

In one subembodiment of the embodiment, the starting SFN of the gap for MUSIM gap is the first frame.

In one embodiment, MUSIM GapInfo comprised in the first message comprises a starting sub-frame of the requested gap for MUSIM.

In one subembodiment of the embodiment, the starting SFN of the gap for MUSIM is the first sub-frame.

In one subembodiment of the embodiment, a musim-Starting-SFN-AndSub-frame field in MUSIM-GapInfo comprised in the first message indicates the first frame and the first sub-frame.

In one embodiment, the first sub-frame is a sub-frame of the first frame.

In one embodiment, the first gap is a response or configuration of the network to the aperiodic gap requested by the first message starting at a first frame and a first sub-frame for MUSIM, and parameters of the first gap can only be the same as parameters of the requested aperiodic gap starting at a first frame and a first sub-frame for MUSIM.

In one embodiment, the first message indicates whether the requested aperiodic gap starting at a first frame and a first sub-frame for MUSIM is applied to an MCG or an SCG.

In one embodiment, the first message indicates that the requested aperiodic gap starting at a first frame and a first sub-frame for MUSIM is applied to either MCG or SCG.

In one embodiment, when the aperiodic gap requested by the first message starting at a first frame and a first sub-frame for MUSIM is applied to an MCG, the first gap is applied to an MCG; when the aperiodic gap requested by the first message starting at a first frame and a first sub-frame for MUSIM is applied to an SCG, the first gap is applied to an SCG.

Embodiment 10

Figure 10:
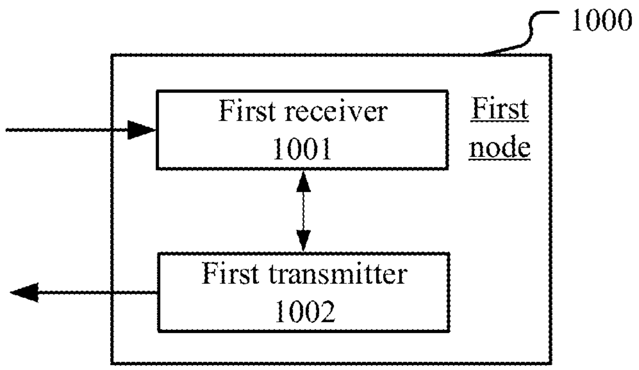
FIG. 10 illustrates a schematic diagram of a processor in a first node according to one embodiment of the present application.

Embodiment 10 illustrates a structure block diagram of a processor in a first node according to one embodiment of the present application, as shown in FIG. 10. In FIG. 10, a processor 1000 in a first node comprises a first receiver 1001 and a first transmitter 1002. In Embodiment 10, the first receiver 1001 receives a first signaling, the first signaling comprises a first field, the first field configures a first gap set; a position of the first field in the first signaling is used to determine whether the first gap set is applied to an MCG;

herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, the first gap set is for MUSIM.

In one embodiment, the first transmitter 1002 transmits a first message, and the first message is used to request an aperiodic gap starting at a first frame and a first sub-frame for MUSIM;

herein, the starting SFN of the first gap indicated by the first field is the first frame, the starting sub-frame of the first gap indicated by the first field is the first sub-frame, and the first gap is an aperiodic gap; the gap length of the first gap indicated by the first field belongs to a first gap length set, and the first gap length set only comprises and 20 ms.

In one embodiment, the first message indicates whether the requested aperiodic gap starting at the first frame and the first sub-frame for MUSIM is applied to an MCG or an SCG.

In one embodiment, the first receiver 1001, after the first signaling, receives a second signaling, the second signaling comprises a second field, and the second field is used to indicate releasing the first gap;

herein, a second signaling is RRCReconfiguration; the position of the first field in the first signaling belongs to the first position set, whether the first gap is applied to an MCG or an SCG is unrelated to a position of the second field in the second signaling.

In one embodiment, the first receiver 1001, within the first gap set, executes at least one operation in a first operation set, and the first operation set comprises: cell identification and measurement, paging monitoring, SIB acquisition, and on-demand acquisition of system information;

herein, the first operation set is for a target network, and the target network is a network other than a transmitter of the first signaling.

In one embodiment, whether the first gap set is applied to an SCG is unrelated to whether an SCG of the first node 1000 is activated.

In one embodiment, the first receiver 1001 determines an occurrence of RLF in a first cell group, and as a response to the behavior of determining an occurrence of RLF in a first cell group, releases the first gap set;

herein, a cell group to which the first gap set is applied comprises the first cell group.

In one embodiment, the first node is a UE.

In one embodiment, the first node is a terminal that supports large delay differences.

In one embodiment, the first node is a terminal that supports NTN.

In one embodiment, the first node is an aircraft or vessel.

In one embodiment, the first node is a mobile phone or vehicle terminal.

In one embodiment, the first node is a relay UE and/or U2N remote UE.

In one embodiment, the first node is an Internet of Things terminal or an Industrial Internet of Things terminal.

In one embodiment, the first node is a device that supports transmission with low-latency and high-reliability.

In one embodiment, the first node is a sidelink communication node.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

Embodiment 11

Figure 11:
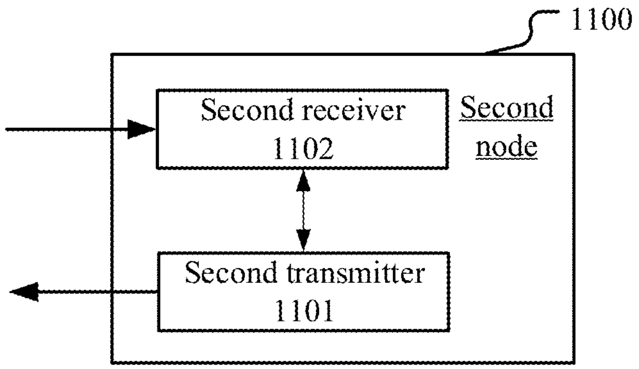
FIG. 11 illustrates a schematic diagram of a processor in a second node according to one embodiment of the present application.

FIG. 11 illustrates a structure block diagram of a processor in a second node according to one embodiment of the present application, as shown in FIG. 11. In FIG. 11, a processor 1100 in a second node comprises a second transmitter 1101 and a second receiver 1102. In Embodiment 11, the second transmitter 1101 transmits a first signaling, the first signaling comprises a first field, the first field configures a first gap set; a position of the first field in the first signaling is used to determine whether the first gap set is applied to an MCG;

herein, the first gap set comprises at least a first gap; the meaning of the phrase that the first field configures a first gap set comprises: the first field indicates a gap length, a starting SFN, and a starting sub-frame of the first gap; the first signaling is RRCReconfiguration; the meaning of the phrase that a position of the first field in the first signaling is used to determine whether the first gap set is applied to an MCG is: when the first field is a first level sub-item of the first signaling, the first field is applied to at least MCG in an MCG and an SCG, when the position of the first field in the first signaling is any position in a first position set, the first field is applied to only SCG in an MCG and an SCG, the first position set comprises at least one position, and any position in the first position set is not a first level sub-item of the first signaling.

In one embodiment, the first gap set is for MUSIM.

In one embodiment, the second receiver 1102 receives a first message, and the first message is used to request an aperiodic gap starting at a first frame and a first sub-frame for MUSIM;

herein, the starting SFN of the first gap indicated by the first field is the first frame, the starting sub-frame of the first gap indicated by the first field is the first sub-frame, and the first gap is an aperiodic gap; the gap length of the first gap indicated by the first field belongs to a first gap length set, and the first gap length set only comprises 10 ms and 20 ms.

In one embodiment, the first message indicates whether the requested aperiodic gap starting at the first frame and the first sub-frame for MUSIM is applied to an MCG or an SCG.

In one embodiment, the second transmitter 1101, after the first signaling, transmits a second signaling, the second signaling comprises a second field, and the second field is used to indicate releasing the first gap;

herein, a second signaling is RRCReconfiguration; the position of the first field in the first signaling belongs to the first position set, whether the first gap is applied to an MCG or an SCG is unrelated to a position of the second field in the second signaling.

In one embodiment, the second node is a satellite.

In one embodiment, the second node is an IoT node.

In one embodiment, the second node is a wearable node.

In one embodiment, the second node is a base station.

In one embodiment, the second node is a relay.

In one embodiment, the second node is an access point.

In one embodiment, the second node is a node supporting multicast.

In one embodiment, the second node is a satellite.

In one embodiment, the second transmitter 1101 comprises at least one of the antenna 420, the transmitter 418, the transmitting processor 416, the multi-antenna transmitting processor 471, the controller/processor 475 or the memory 476 in Embodiment 4.

In one embodiment, the second receiver 1102 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present application includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

This application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:

a receiver configured to receive a radio resource control (RRC) Reconfiguration signaling, the RRCReconfiguration signaling comprising a field that indicates a gap length, a starting System Frame Number (SFN), and a starting sub-frame of a gap in a gap set;

wherein on a condition that the field is a first level sub-item of the RRCReconfiguration signaling, the field is applied to at least a master cell group (MCG), and the starting SFN and the starting sub-frame are with respect to a primary cell of the MCG (PCell); and wherein on a condition that the field is not a first level sub-item of the RRCReconfiguration signaling, the field is applied to only a secondary cell group (SCG), and the starting SFN and the starting sub-frame are with respect to a primary cell of the SCG (PScell).

2. The UE of claim 1, wherein the gap set is for Multi-Universal Subscriber Identity Module (MUSIM) activity.

3. The UE of claim 1, further comprising:

a transmitter configured to transmit a request for an aperiodic gap starting at a first frame and a first sub-frame for Multi-Universal Subscriber Identity Module (MUSIM);

wherein the starting SFN of the gap indicated by the field corresponds to the first frame, the starting sub-frame of the gap indicated by the field is the first sub-frame, and the gap is aperiodic; the gap length of the gap indicated by the field belongs to a gap length set, and the gap length set consists of 10 ms and 20 ms options.

4. The UE of claim 2, further comprising:

a transmitter configured to transmit a request for an aperiodic gap starting at a first frame and a first sub-frame for MUSIM activity;

wherein the starting SFN of the gap indicated by the field corresponds to the first frame, the starting sub-frame of the gap indicated by the field is the first sub-frame, and the gap is aperiodic; the gap length of the gap indicated by the field belongs to a gap length set, and the gap length set consists of 10 ms and 20 ms options.

5. The UE of claim 3, wherein the request indicates whether the requested aperiodic gap starting at the first frame and the first sub-frame for MUSIM activity is applied to the MCG or the SCG.

6. The UE of claim 4, wherein the request indicates whether the requested aperiodic gap starting at the first frame and the first sub-frame for MUSIM activity is applied to the MCG or the SCG.

7. The UE of claim 1, wherein:

the receiver is further configured to receive, after the RRCReconfiguration signaling, a second RRCReconfiguration signaling, the second RRCReconfiguration signaling comprising a second field that indicate a release of the gap;

wherein the field in the RRCReconfiguration signaling is not a first level sub-item, and whether the gap is applied to the MCG or the SCG is unrelated to a position of the second field in the second RRCReconfiguration signaling.

8. The UE of claim 2, wherein:

the receiver is further configured to receive, after the RRCReconfiguration signaling, a second RRCReconfiguration signaling, the second RRCReconfiguration signaling comprising a second field that indicate a release of the gap;

wherein the field in the RRCReconfiguration signaling is not a first level sub-item, and whether the gap is applied to the MCG or the SCG is unrelated to a position of the second field in the second RRCReconfiguration signaling.

9. The UE of claim 3, wherein:

the receiver is further configured to receive, after the RRCReconfiguration signaling, a second RRCReconfiguration signaling, the second RRCReconfiguration signaling comprising a second field that indicate a release of the gap;

wherein the field in the RRCReconfiguration signaling is not a first level sub-item, and whether the gap is applied to the MCG or the SCG is unrelated to a position of the second field in the second RRCReconfiguration signaling.

10. The UE of claim 1, wherein:

the receiver is further configured to execute, within the gap set, at least one operation in an operation set, and the operation set comprising: cell identification and measurement, paging monitoring, system information block (SIB) acquisition, and on-demand acquisition of system information;

wherein the operation set is for a network other than a transmitter of the RRCReconfiguration signaling.

11. The UE of claim 1, wherein whether the gap set is applied to the SCG is unrelated to whether the SCG of the UE is activated.

12. The UE of claim 2, wherein whether the gap set is applied to the SCG is unrelated to whether the SCG of the UE is activated.

13. The UE of claim 3, wherein whether the gap set is applied to the SCG is unrelated to whether the SCG of the UE is activated.

14. The UE of claim 1, wherein the receiver is further configured to:

determine an occurrence of Radio Link Failure (RLF) in a cell group; and release the gap set;

wherein the gap set applies to the cell group.

15. The UE of claim 1, wherein:

on a condition that the gap is aperiodic, the field does not indicate an identity of the gap; and on a condition that the gap is periodic, the field indicates an identity of the gap.

16. The UE of claim 1, wherein on a condition that the SCG of the UE is activated, the gap set is applied to the SCG, otherwise the gap set is not applied to the SCG.

17. The UE of claim 3, wherein the request indicates that the requested aperiodic gap is applied to either the MCG or the SCG.

18. The UE of claim 1, wherein:

on a condition that the gap is applied to the MCG, the starting SFN and the starting sub-frame of the gap is for timing of the MCG or the PCell; and on a condition that the gap is applied to the SCG and not to the MCG, the starting SFN and the starting sub-frame of the gap is for timing of the SCG or the PSCell.

19. A base station for wireless communications, the base station comprising:

a transmitter configured to transmit a radio resource control (RRC) Reconfiguration signaling, the RRCReconfiguration signaling comprising a field that indicates a gap length, a starting System Frame Number (SFN), and a starting sub-frame of a gap in a gap set;

wherein on a condition that the field is a first level sub-item of the RRCReconfiguration signaling, the field is applied to at least a master cell group (MCG), and the starting SFN and the starting sub-frame are with respect to a primary cell of the MCG (PCell); and wherein on a condition that the field is not a first level sub-item of the RRCReconfiguration signaling, the field is applied to only a secondary cell group (SCG), and the starting SFN and the starting sub-frame are with respect to a primary cell of the SCG (PScell).

20. A method performed by a user equipment (UE), the method comprising:

receiving a radio resource control (RRC) Reconfiguration signaling, the RRCReconfiguration signaling comprising a field that indicates a gap length, a starting System Frame Number (SFN), and a starting sub-frame of a gap in a gap set;

wherein on a condition that the field is a first level sub-item of the RRCReconfiguration signaling, the field is applied to at least a master cell group (MCG), and the starting SFN and the starting sub-frame are with respect to a primary cell of the MCG (PCell); and wherein on a condition that the field is not a first level sub-item of the RRCReconfiguration signaling, the field is applied to only a secondary cell group (SCG), and the starting SFN and the starting sub-frame are with respect to a primary cell of the SCG (PScell).

* * * * *